(No Model.)
A. GARTNER.
SPINDLE.
No. 590,260. Patented Sept. 21, 1897.
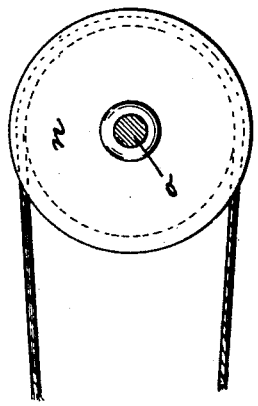
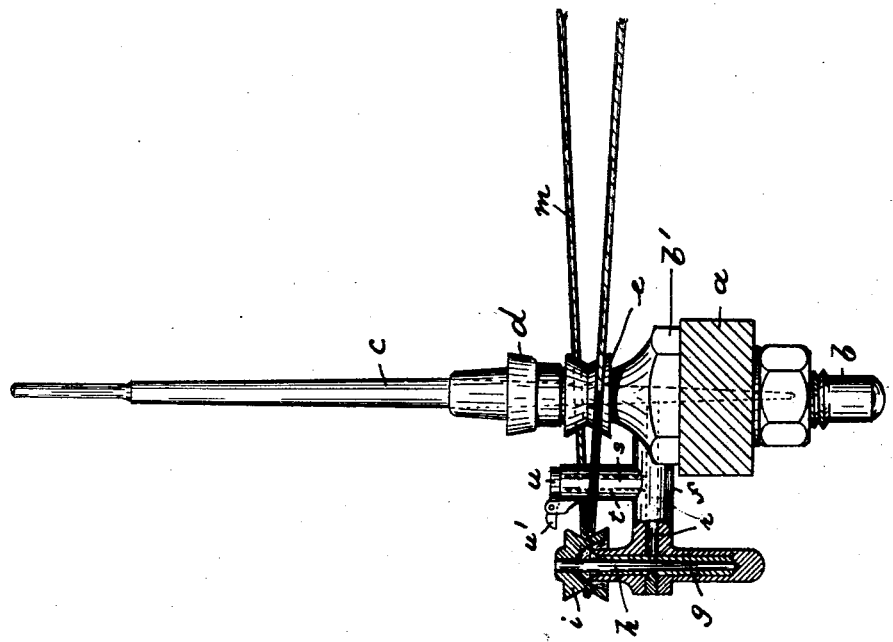
WITNESSES:
Wm. D. Nell.
L. Snyder
INVENTOR:
Alfred Gartner
BY Gartner & Co
ATTORNEYS

UNITED STATES PATENT OFFICE.

ALFRED GARTNER, OF PATERSON, NEW JERSEY, ASSIGNOR TO THE DRAPER COMPANY, OF PORTLAND, MAINE.

SPINDLE.

SPECIFICATION forming part of Letters Patent No. 590,260, dated September 21, 1897.

Application filed June 30, 1897. Serial No. 642,900. (No model.)

*To all whom it may concern:*

Be it known that I, ALFRED GARTNER, a citizen of the United States, residing at Paterson, county of Passaic, and State of New Jersey, have invented certain new and useful Improvements in Spindles; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

My present invention relates to spinning-spindles, and is an improvement on the device covered by United States Letters Patent No. 586,789, of July 20, 1897.

The object of this invention is to provide a spinning-spindle of the character above referred to, with simple means for lubricating said spindle and its auxiliary-wheel-supporting shaft, to thus render said spindle more durable and more efficient.

The invention consists in the arrangement of the auxiliary wheel or pulley supporting shaft within a tube containing step-and-bolster bearings and carried by the spindle-supporting bolster and communicating therewith and with an oil-chamber, substantially as will be hereinafter more fully described, and finally embodied in the clauses of the claim.

In the accompanying drawing, which represents in side elevation my improved spinning-spindle, $a$ is the spindle-rail, in which is mounted the bolster $b$, containing step-and-bolster bearings for the spindle $c$, provided with the sleeve $d$ and whirl $e$, which latter is in engagement with the endless belt $m$, receiving its motion from the driving-pulley $n$, mounted on the shaft $o$ and of usual and well-known construction.

The bolster $b$ is provided with an annular flange $b'$, from which projects an arm $f$, carrying at or near its free end a tube $g$, the latter containing step-and-bolster bearings for the vertically-arranged shaft $h$, on the top portion of which is mounted the auxiliary wheel or pulley $i$, substantially in the plane of the whirl $e$ and adapted to be engaged by the driving band or belt $m$, as clearly shown.

The tube $g$ communicates, through a channel $r$, with the bolster $b$ and also with the oil cup or chamber $t$, (through a channel $s$,) which latter cup is preferably mounted on the arm $f$ and is provided with a hinged cap $u$, having its arm $u'$ projecting rearwardly over and above the edge of the auxiliary wheel or pulley $i$, and is adapted to prevent said pulley from being moved upward and thus out of alinement with the whirl $e$, as will be manifest. There is no necessity for a similar arrangement to be used in connection with the whirl $e$, as the driving band or belt $m$, engaging said whirl at opposite sides, will prevent the latter, and thus the spindle $c$, from a vertical movement.

Having thus described my invention, what I claim as new, and desire to secure by Letters Patent, is—

1. The combination with a sleeve whirl spindle and its supporting-bolster, of a vertically-arranged tube carried by said bolster, a shaft mounted in said tube, an auxiliary wheel or pulley on said shaft, driving means at the opposite side of the spindle, and an endless belt passing over said driving means and auxiliary wheel or pulley and intermediately engaging said whirl of the spindle, substantially as and for the purposes described.

2. The combination with a sleeve whirl spindle and its supporting-bolster and with the driving means on one side of said spindle, of an arm projecting from the bolster on the opposite side of the spindle, an oil-cup carried by said arm and communicating with said bolster, a tube carried by said arm and containing step-and-bolster bearings and also communicating with said oil-cup, a shaft revolubly mounted in said tube, an auxiliary wheel or pulley carried by said shaft, and an endless belt passing over said driving means and auxiliary wheel or pulley and intermediately engaging said whirl of the spindle, substantially as and for the purposes described.

In testimony that I claim the foregoing I have hereunto set my hand this 25th day of June, 1897.

ALFRED GARTNER.

Witnesses:
  WM. D. BELL,
  L. SNYDER.